United States Patent
Byun et al.

(10) Patent No.: US 10,627,548 B2
(45) Date of Patent: *Apr. 21, 2020

(54) ANTI-REFLECTIVE FILM AND MANUFACTURING METHOD THEREOF

(71) Applicant: LG CHEM, LTD., Seoul (KR)

(72) Inventors: Jin Seok Byun, Daejeon (KR); Heon Kim, Daejeon (KR); Boo Kyung Kim, Daejeon (KR); Seok Hoon Jang, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,257

(22) PCT Filed: Nov. 3, 2016

(86) PCT No.: PCT/KR2016/012591
§ 371 (c)(1),
(2) Date: Aug. 10, 2017

(87) PCT Pub. No.: WO2017/078428
PCT Pub. Date: May 11, 2017

(65) Prior Publication Data
US 2018/0231688 A1     Aug. 16, 2018

(30) Foreign Application Priority Data

Nov. 4, 2015   (KR) ........................ 10-2015-0154591
Oct. 31, 2016   (KR) ........................ 10-2016-0142886

(51) Int. Cl.
*G02B 1/111*     (2015.01)
*G02B 1/14*     (2015.01)
(Continued)

(52) U.S. Cl.
CPC ................ *G02B 1/111* (2013.01); *B32B 7/02* (2013.01); *B32B 27/08* (2013.01); *C08J 7/042* (2013.01);
(Continued)

(58) Field of Classification Search
CPC .......... G02B 1/111; C09D 4/00; B32B 27/08; C08K 7/26; C08K 3/36
See application file for complete search history.

(56) References Cited

U.S. PATENT DOCUMENTS

| 8,512,801 | B2 | 8/2013 | Yoshihara et al. |
| 10,222,510 | B2 * | 3/2019 | Song ...................... C09D 5/004 |

(Continued)

FOREIGN PATENT DOCUMENTS

| CN | 101855303 A | 10/2010 |
| CN | 103091733 A | 5/2013 |

(Continued)

OTHER PUBLICATIONS

Chemical material name—Pentaerythritol triacrylate, 2009. [online][retrieved on Aug. 28, 2018] Retrieved from the Internet:<URL: http://anzeninfo.mhlw.go.jp/anzen/gmsds/3524-68-3.htm> with English abstract, pp. 7 pages.

(Continued)

*Primary Examiner* — Hai Vo
(74) *Attorney, Agent, or Firm* — Rothwell, Figg, Ernst & Manbeck, P.C.

(57) ABSTRACT

Described herein is an anti-reflective film including: a hard coating layer; and a low-refractive layer containing a binder resin and hollow inorganic nanoparticles and solid inorganic nanoparticles dispersed in the binder resin. The hollow and solid inorganic particles are dispersed in the low-refractive layer such that the amount of the solid inorganic nanoparticles positioned close to an interface between the hard (Continued)

coating layer and the low-refractive layer is larger than that of the hollow inorganic nanoparticles. Also described is a manufacturing method of the anti-reflective film including: applying a resin composition containing a photopolymerizable compound or a (co)polymer thereof, a fluorine-containing compound including a photoreactive functional group, a photoinitiator, hollow inorganic nanoparticles, and solid inorganic nanoparticles on a hard coating layer, and drying the applied resin composition at a temperature of 35° C. to 100° C.; and photocuring the dried resin composition.

15 Claims, 8 Drawing Sheets

(51) Int. Cl.
  B32B 27/08      (2006.01)
  B32B 7/02       (2019.01)
  C08J 7/04       (2020.01)
  C09D 4/00       (2006.01)
  C08K 3/36       (2006.01)
  C08K 7/26       (2006.01)

(52) U.S. Cl.
  CPC .............. C09D 4/00 (2013.01); G02B 1/14 (2015.01); C08J 2301/02 (2013.01); C08J 2435/02 (2013.01); C08K 3/36 (2013.01); C08K 7/26 (2013.01)

(56) References Cited

U.S. PATENT DOCUMENTS

| | | | |
|---|---|---|---|
| 10,234,599 B2* | 3/2019 | Byun | C08J 5/18 |
| 2005/0038187 A1* | 2/2005 | Mano | C08F 8/30 |
| | | | 525/101 |
| 2006/0057307 A1 | 3/2006 | Matsunaga et al. | |
| 2006/0216438 A1* | 9/2006 | Nishimura | G02B 1/105 |
| | | | 428/1.31 |
| 2008/0032053 A1 | 2/2008 | Kourtakis et al. | |
| 2008/0182038 A1 | 7/2008 | Matsunaga et al. | |
| 2009/0176084 A1 | 7/2009 | Yoshihara et al. | |
| 2010/0067109 A1 | 3/2010 | Horio et al. | |
| 2010/0189971 A1 | 7/2010 | Isono et al. | |
| 2010/0196687 A1 | 8/2010 | Isono et al. | |
| 2010/0311868 A1* | 12/2010 | Bekiarian | B82Y 30/00 |
| | | | 523/218 |
| 2012/0200933 A1* | 8/2012 | Akiyama | G02B 5/0242 |
| | | | 359/601 |
| 2013/0135726 A1 | 5/2013 | Wakizaka et al. | |
| 2013/0215514 A1 | 8/2013 | Kim et al. | |
| 2013/0216818 A1 | 8/2013 | Kim et al. | |
| 2014/0168776 A1 | 6/2014 | Saito et al. | |
| 2016/0077239 A1 | 3/2016 | Asahi et al. | |
| 2016/0304722 A1 | 10/2016 | Kobori | |
| 2017/0131439 A1 | 5/2017 | Kobori et al. | |
| 2018/0231687 A1* | 8/2018 | Byun | C09D 5/004 |

FOREIGN PATENT DOCUMENTS

| | | |
|---|---|---|
| CN | 103782203 A | 5/2014 |
| JP | 2003-322703 A | 11/2003 |
| JP | 2004-034399 A | 2/2004 |
| JP | 2006337663 A | 12/2006 |
| JP | 2007-272132 A | 10/2007 |
| JP | 2007272131 A | 10/2007 |
| JP | 2008107792 A | 5/2008 |
| JP | 2008-169364 A | 7/2008 |
| JP | 2009-053691 A | 3/2009 |
| JP | 2009-204698 A | 9/2009 |
| JP | 2009-244382 A | 10/2009 |
| JP | 2009-545651 A | 12/2009 |
| JP | 2010084017 A | 4/2010 |
| JP | 2010085983 A | 4/2010 |
| JP | 2011-505465 A | 2/2011 |
| JP | 2011-088787 A | 5/2011 |
| JP | 2011-102977 A | 5/2011 |
| JP | 2012-128086 A | 7/2012 |
| JP | 5017775 B2 | 9/2012 |
| JP | 5082201 B2 | 11/2012 |
| JP | 2013-130865 A | 7/2013 |
| JP | 5259334 B2 | 8/2013 |
| JP | 5292235 B2 | 9/2013 |
| JP | 2013190628 A | 9/2013 |
| JP | 2013205645 A | 10/2013 |
| JP | 2013-228741 A | 11/2013 |
| JP | 2014-041249 A | 3/2014 |
| JP | 2014-074779 A | 4/2014 |
| JP | 2014-085383 A | 5/2014 |
| JP | 2014-106088 A | 6/2014 |
| JP | 5592671 B2 | 9/2014 |
| JP | 2014-209138 A | 11/2014 |
| JP | 2014-529762 A | 11/2014 |
| JP | 2014-240929 A | 12/2014 |
| JP | 2015-108733 A | 6/2015 |
| JP | 2015-232614 A | 12/2015 |
| JP | 2017-021293 A | 1/2017 |
| KR | 1020050065345 A | 6/2005 |
| KR | 1020100039869 A | 4/2010 |
| KR | 1020110060810 A | 6/2011 |
| KR | 1020110121233 A | 11/2011 |
| KR | 1020120093212 A | 8/2012 |
| KR | 1020140006922 A | 1/2014 |
| KR | 1020140037080 A | 3/2014 |
| KR | 1020140050538 A | 4/2014 |
| KR | 1020150032564 A | 3/2015 |
| KR | 1020160002407 A | 1/2016 |
| KR | 1020160031448 A | 3/2016 |
| WO | 2005-085913 A1 | 9/2005 |
| WO | 2012-147527 A1 | 11/2012 |
| WO | 2012-157682 A1 | 11/2012 |
| WO | 2013-018187 A1 | 2/2013 |

OTHER PUBLICATIONS

"Organosilicasol", Nissan Chemical Corporation, retrieved from: https://www.nissanchem.co.jp/products/materials/inorganic/products/02/ on Jul. 1, 2019, 6 pages.

"Nanomaterial information providing sheet—Amorphous colloidal silica", Ministry of Economy, Trade and Industry, Jul. 2015, retrieved from: http://warp.da.ndl.go.jp/info:ndljp/pid/10977616/www.meti.go.jp/policy/chemical_management/files/nanomaterial/150626SiO3.pdf, 19 pages.

"Nanomaterial information providing sheet—Silica manufactured by a dry method called as flame hydrolysis method or combustion hydrolysis method", Ministry of Economy, Trade and Industry, Jul. 2015, retrieved from: http://warp.da.ndl.go.jp/info:ndljp/pid/10977616/www.meti.go.jp/policy/chemical_management/files/nanomaterial/150626SiO2.pdf, 10 pages.

"Diantimony pentoxide", Encyclopedia Chimica, Kyoritsu Shuppan Co., Ltd., vol. 3, Issue 38, 2013, p. 635.

* cited by examiner

ANTI-REFLECTIVE FILM AND MANUFACTURING METHOD THEREOF

CROSS-REFERENCE TO RELATED APPLICATION

This application is a Continuation Bypass of International Application No. PCT/KR2016/012591, filed on Nov. 3, 2017, and claims priority to, and the benefit of, Korean Patent Application No. 10-2015-0154591 filed in the Korean Intellectual Property Office on Nov. 4, 2015, and Korean Patent Application No. 10-2016-0142886 filed in the Korean Intellectual Property Office on Oct. 31, 2016, the entire contents of which are incorporated herein by reference.

TECHNICAL FIELD

The present invention relates to an anti-reflective film and a manufacturing method thereof. More particularly, the present invention relates to an anti-reflective film capable of having low reflectance and high light transmittance, while simultaneously imparting high scratch-resistance and anti-fouling property, and enhancing the sharpness of a screen of a display device, and a manufacturing method thereof.

BACKGROUND OF THE INVENTION

In general, an anti-reflective film is mounted on a flat-panel display device, such as a plasma display panel (PDP), a liquid crystal display (LCD), and the like, to minimize reflection of light incident from the outside.

Methods for minimizing reflection of light include dispersing fillers, such as inorganic fine particles, in a resin and coating the resin on a substrate film to impart unevenness (i.e. anti-glare (AG) coating method), forming a plurality of layers having different refractive indices on a substrate film to use light interference (i.e. anti-reflection (AR) coating method), or a combination of these methods, and the like.

In the AG coating method, the absolute amount of reflected light is equivalent to that of a general hard coating method, but it is possible to reduce the amount of reflection by increasing the unevenness of the surface of a substrate, thereby decreasing the amount of light entering the eyes of a viewer. However, due to the unevenness of the surface, the sharpness of the screen deteriorates. Therefore, recently, the AR coating method has been increasingly studied.

A commercially available film having a multilayer structure in which a hard coating layer (high-refractive index layer), a low-reflective coating layer, and the like, are laminated on a substrate film may be used in the AR coating method. However, in the method of forming the above-described plurality of layers, the interfacial adhesion between the various layers may be weak, thereby deteriorating the scratch resistance.

In order to improve scratch resistance of the low-refractive layer included in the anti-reflective film, various nanometer-size particles (for example, silica particles, alumina particle, zeolite particles, or the like) may be added. However, in such a case, it is difficult to increase scratch resistance while also decreasing the reflectance of the low-refractive layer, thereby significantly reducing the anti-fouling property of a surface of the low-refractive layer.

Therefore, various studies for decreasing reflectance while also improving anti-fouling property and scratch resistance of a surface have been conducted, but physical properties of the anti-reflective film are not sufficiently improved in spite of these studies.

SUMMARY OF THE INVENTION

An inventive aspect of this application is to provide an anti-reflective film having the advantageous effects of low reflectance and high light transmittance, high scratch-resistance and anti-fouling properties, and enhanced sharpness of a screen of a display device.

Another inventive aspect of this application is to provide a manufacturing method for an anti-reflective film having the above-mentioned characteristics.

An inventive aspect of this application provides an anti-reflective film comprising: a hard coating layer; and a low-refractive layer formed on one surface of the hard coating layer, where the low-refractive layer comprises hollow inorganic nanoparticles and solid inorganic nanoparticles dispersed in a binder resin, and where at least 70 vol % of the entire solid inorganic nanoparticles are present within a distance $d_{1/2}$ measured from an interface between the hard coating layer and the low-refractive layer, wherein the distance $d_{1/2}$ is half the entire thickness d of the low-refractive layer.

In another inventive aspect, the density difference between the solid inorganic nanoparticles and the hollow inorganic nanoparticles is 0.30 $g/cm^3$ to 3.00 $g/cm^3$.

In another inventive aspect, at least 30 vol % of the entire hollow inorganic nanoparticles are present at a distance farther than that of the entire solid inorganic nanoparticles from the interface between the hard coating layer and low-refractive layer in a thickness direction of the low-refractive layer.

In another inventive aspect, at least 70 vol % of the entire solid inorganic nanoparticles are present within a distance $d_{1/3}$ measured from the interface between the hard coating layer and the low-refractive layer, wherein the distance $d_{1/3}$ is one-third of the entire thickness d of the low-refractive layer.

In another inventive aspect, at least 70 vol % of the entire hollow inorganic nanoparticles are present beyond the distance $d_{1/3}$ measured from the interface between the hard coating layer and the low-refractive layer.

In another inventive aspect, the low-refractive layer includes a first layer containing at least 70 vol % of the entire solid inorganic nanoparticles and a second layer containing at least 70 vol % of the entire hollow inorganic nanoparticles, and the first layer is positioned to be closer to the interface between the hard coating layer and the low-refractive layer than the second layer.

In another inventive aspect, an average reflectance of the anti-reflective film in a visible light wavelength region of 380 nm to 780 nm is 0.7% or less.

In another inventive aspect, each of the solid inorganic nanoparticles and the hollow inorganic nanoparticles contains one or more reactive functional groups selected from the group consisting of a (meth)acrylate group, an epoxide group, a vinyl group, and a thiol group on a surface thereof.

In another inventive aspect, the solid inorganic nanoparticles have a density of 2.00 $g/cm^3$ to 5.00 $g/cm^3$, and the hollow inorganic nanoparticles have a density of 1.50 $g/cm^3$ to 3.50 $g/cm^3$.

In another inventive aspect, the binder resin contained in the low-refractive layer contains a cross-linked (co)polymer of a (co)polymer of a photopolymerizable compound and a fluorine-containing compound including a photoreactive functional group.

In another inventive aspect, the low-refractive layer contains 10 to 400 parts by weight of the hollow inorganic nanoparticles and 10 to 400 parts by weight of the solid inorganic nanoparticles, based on 100 parts by weight of the (co)polymer of the photopolymerizable compound.

In another inventive aspect, the photopolymerizable compound includes a monomer or oligomer including (meth) acrylate or a vinyl group.

In another inventive aspect, the fluorine-containing compound including the photoreactive functional group has a weight average molecular weight of 2,000 to 200,000, respectively.

In another inventive aspect, the binder resin contains 20 to 300 parts by weight of the fluorine-containing compound including the photoreactive functional group based on 100 parts by weight of the (co)polymer of the photopolymerizable compound.

In another inventive aspect, the photoreactive functional group of the fluorine-containing compound is one or more selected from the group consisting of a (meth)acrylate group, an epoxide group, a vinyl group, and a thiol group.

In another inventive aspect, the fluorine-containing compound including the photoreactive functional group includes one or more selected from the group consisting of i) an aliphatic compound or alicyclic compound in which one or more photoreactive functional groups are substituted, and at least one carbon atom is substituted with one or more fluorine atoms; ii) a hetero aliphatic compound or hetero alicyclic compound in which one or more photoreactive functional groups are substituted, at least one hydrogen atom is substituted with a fluorine atom, and one or more carbon atoms are substituted with a silicon atom; iii) a polydialkylsiloxane based polymer in which one or more photoreactive functional groups are substituted, and at least one silicon atom is substituted with one or more fluorine atoms; and iv) a polyether compound in which one or more photoreactive functional groups are substituted, and at least one hydrogen atom is substituted with a fluorine atom.

In another inventive aspect, a surface of each of the hollow inorganic nanoparticles and the solid inorganic nanoparticles contained in the low-refractive layer comprises a reactive functional group or silane coupling agent.

In another inventive aspect, the reactive functional group includes one or more functional groups selected from the group consisting of alcohol, amine, carboxylic acid, epoxide, imide, (meth)acrylate, nitrile, norbornene, olefin, polyethylene glycol, thiol, silane, and vinyl groups.

In another inventive aspect, the silane coupling agent includes one or more selected from the group consisting of vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-(meth)acryloxypropyltriethoxysilane, 3-(meth)acryloxypropyltrimethoxysilane, 3-(meth)acryloxypropylmethyldimethoxysilane, 3-(meth)acryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatepropyltriethoxysilane.

In another inventive aspect, the low-refractive layer further contains a silane based compound including one or more reactive functional groups selected from the group consisting of a vinyl group and a (meth)acrylate group.

In another inventive aspect, the hard coating layer includes a binder resin containing a photocurable resin and organic or inorganic fine particles dispersed in the binder resin.

In another inventive aspect, the organic or inorganic fine particles have an average particle diameter of 1 to 10 μm.

Another inventive aspect of this application provides a manufacturing method of an anti-reflective film, the manufacturing method comprising: applying a resin composition for forming a low-refractive layer on a hard coating layer, drying the applied resin composition at a temperature of 35° C. to 100° C.; and photocuring the dried resin composition. The resin composition comprises a photopolymerizable compound or a (co)polymer thereof, a fluorine-containing compound including a photoreactive functional group, a photoinitiator, hollow inorganic nanoparticles, and solid inorganic nanoparticles.

In another inventive aspect, the resin composition is dried at a temperature of 40° C. to 80° C.

In another inventive aspect, the resin composition is dried for 10 seconds to 5 minutes.

In another inventive aspect, a density difference between the solid inorganic nanoparticles and the hollow inorganic nanoparticles is 0.30 g/cm$^3$ to 3.00 g/cm$^3$.

In another inventive aspect, the solid inorganic nanoparticles have a density of 2.00 g/cm$^3$ to 5.00 g/cm$^3$, and the hollow inorganic nanoparticles have a density of 1.50 g/cm$^3$ to 3.50 g/cm$^3$.

In another inventive aspect, the manufacturing method of an anti-reflective film further includes applying a polymer resin composition for forming a hard coating layer on a substrate and photocuring the applied polymer resin composition. The polymer resin composition comprises a photopolymerizable monomer or a (co)polymer thereof, a photoinitiator, and an antistatic agent.

In another inventive aspect, the polymer resin composition further comprises one or more compounds selected from the group consisting of an alkoxy silane based oligomer and a metal alkoxide based oligomer.

DETAILED DESCRIPTION

Figure 1:
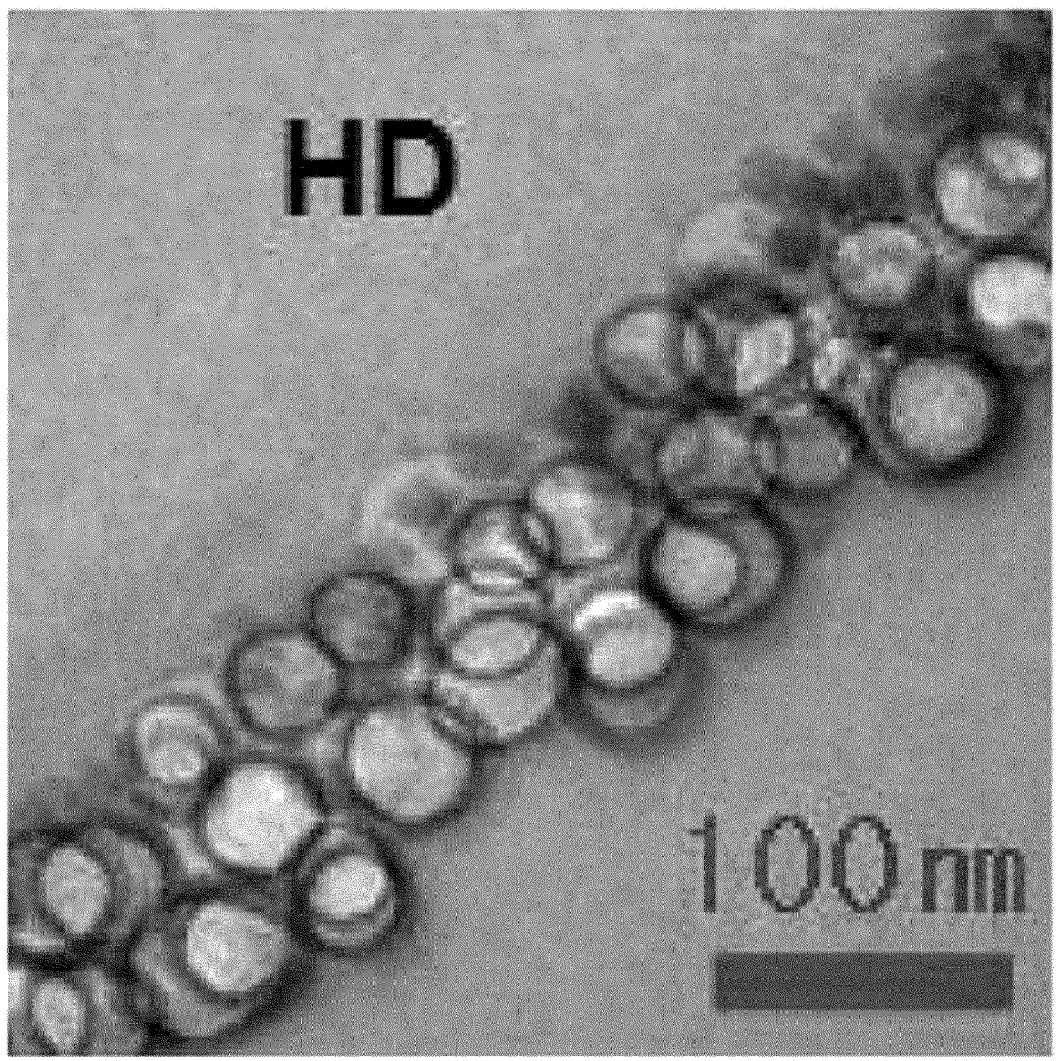
FIG. 1 is a transmission electron microscope (TEM) image of a cross section of an anti-reflective film in Example 1.
Figure 2:
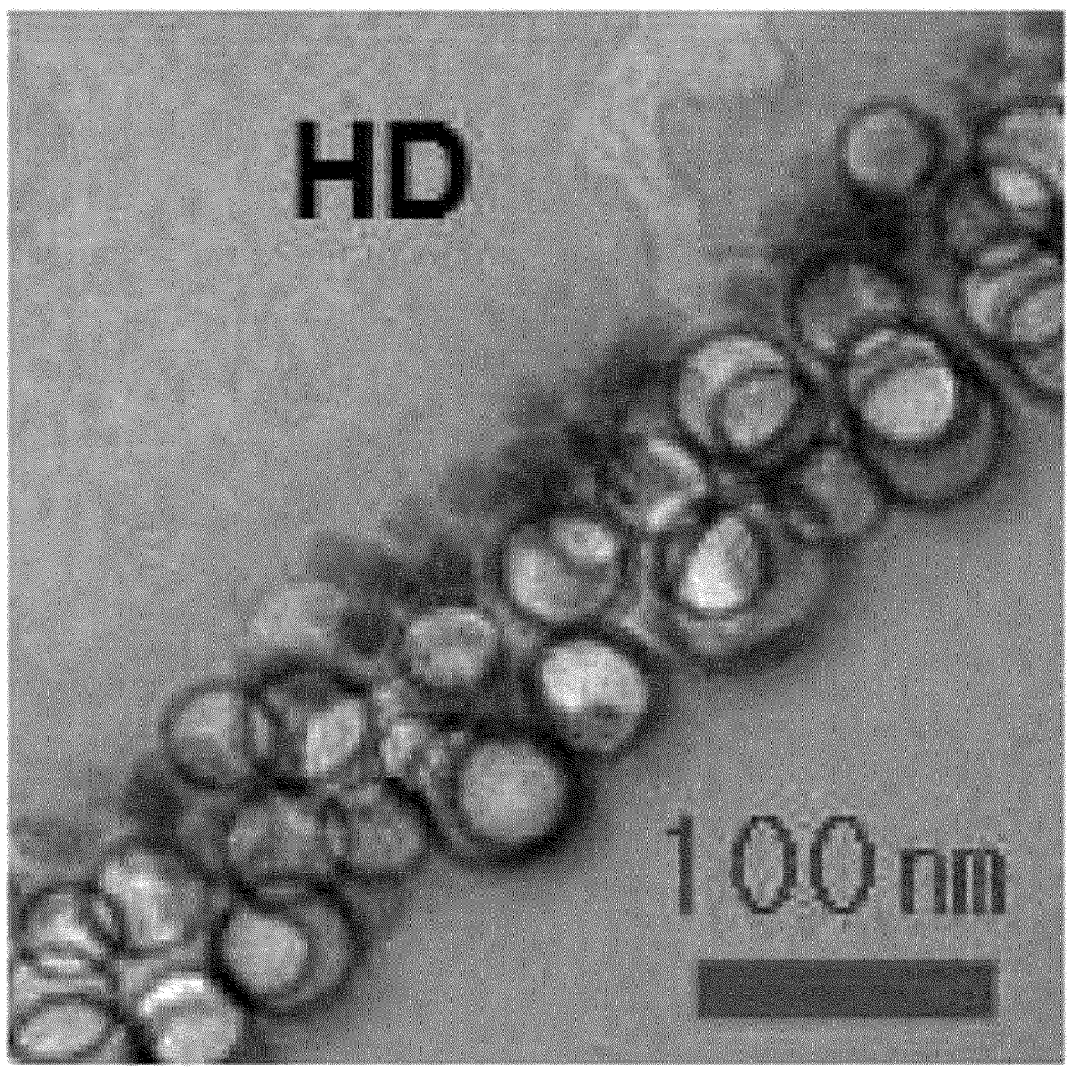
FIG. 2 is a TEM image of a cross section of an anti-reflective film in Example 2.
Figure 3:
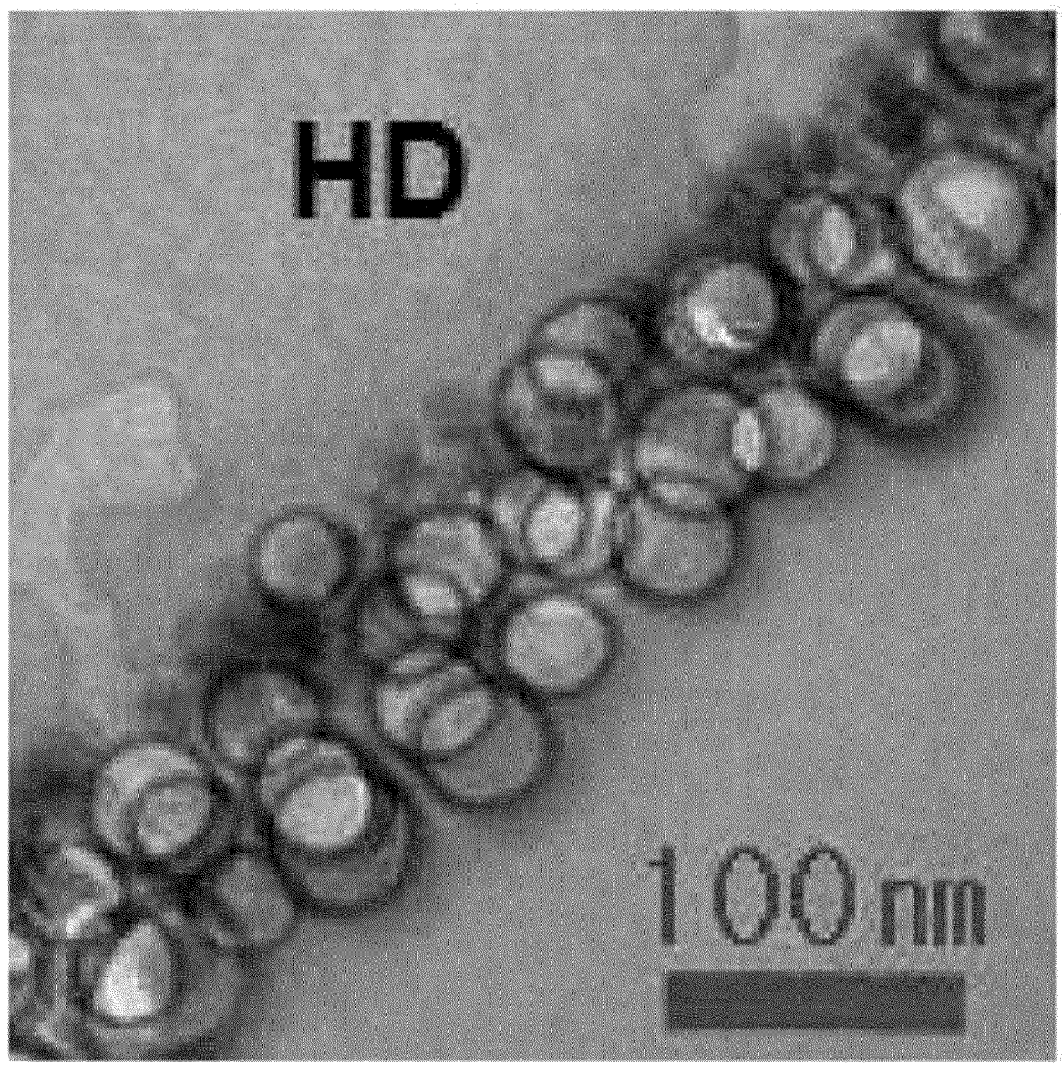
FIG. 3 is a TEM image of a cross section of an anti-reflective film in Example 3.
Figure 4:
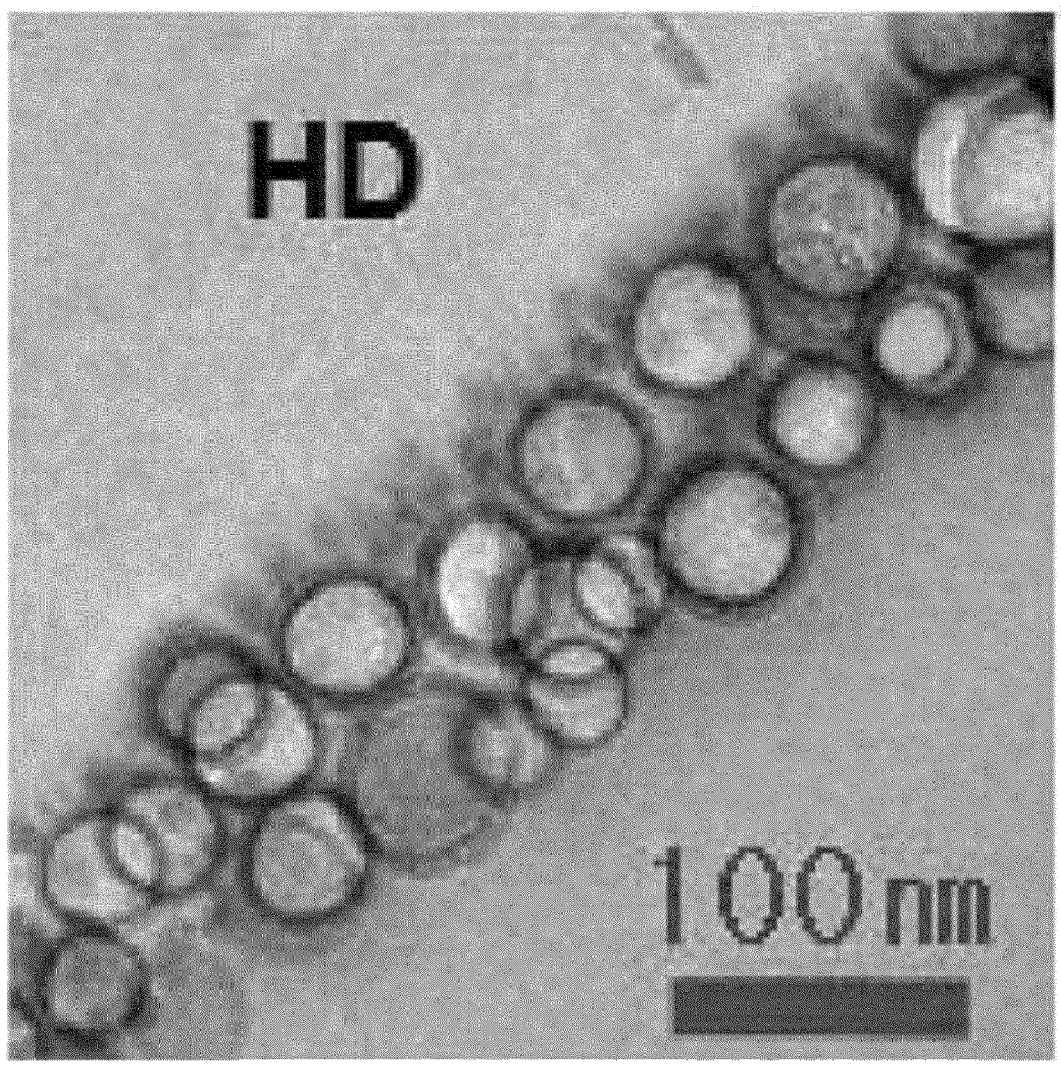
FIG. 4 is a TEM image of a cross section of an anti-reflective film in Example 4.
Figure 5:
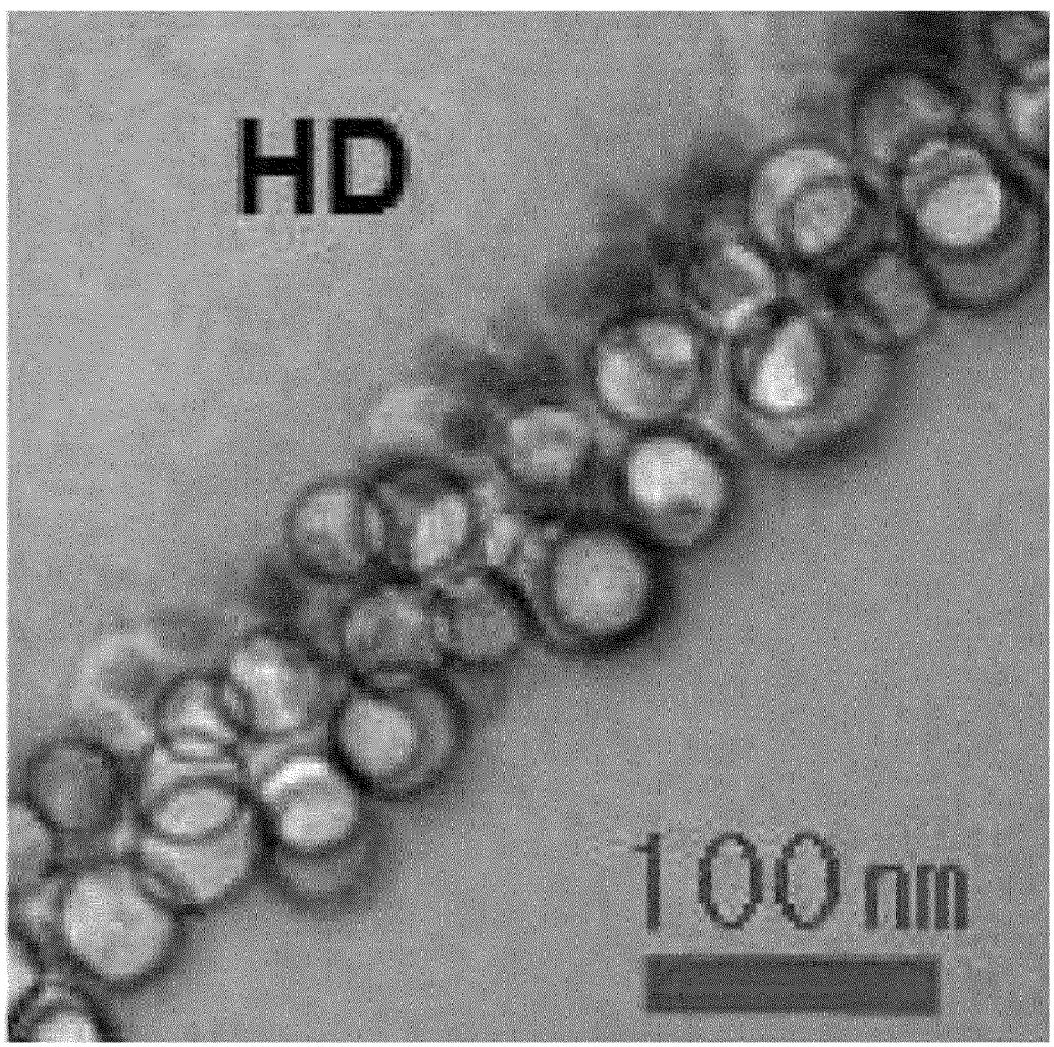
FIG. 5 is a TEM image of a cross section of an anti-reflective film in Example 5.
Figure 6:
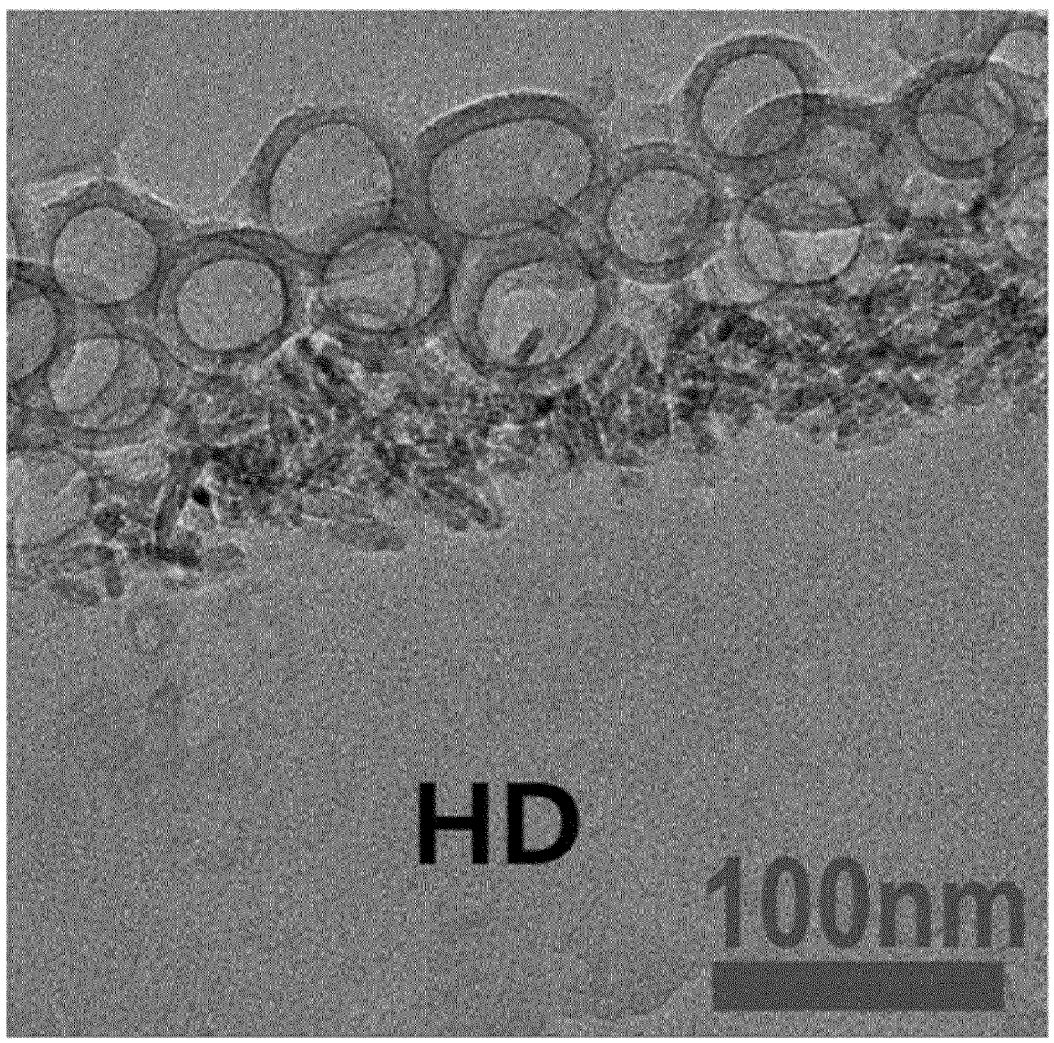
FIG. 6 is a TEM image of a cross section of an anti-reflective film in Example 6.

Hereinafter, the anti-reflective film and the manufacturing method of an anti-reflective film according to the exemplary embodiments of the present invention will be described in more detail.

As used herein, the term "photopolymerizable compound" collectively refers to compounds causing a polymerization reaction when light, for example, visible light or UV light, is irradiated thereto.

As used herein, the term "fluorine-containing compound" refers to a compound containing at least one fluorine element.

As used herein, the term "(meth)acryl" is used to describe both acryl and methacryl.

As used herein, the term "(co)polymer" is used to describe both a copolymer and a homo-polymer.

As used herein, the term "hollow silica particles" refers to silica particles derived from a silicon compound or an organic silicon compound, and includes particles having a shape in which an empty space is present on the surfaces and/or the insides of the silica particles. As used herein, the term "solid silica particles" refers to particles having a shape in which an empty space is not present in the insides thereof.

In the past, an excessive amount of inorganic particles was added to an anti-reflective film to increase the scratch resistance thereof. However, in the extent to which the scratch resistance of the anti-reflective film could be increased was limited by the corresponding decrease in reflectance and anti-fouling property.

Therefore, the present inventors conducted further research regarding anti-reflective films and unexpectedly discovered through various experiments that when the distribution of the hollow inorganic nanoparticles and solid inorganic nanoparticles in the low-refractive layer included in the anti-reflective film are distinguishable from each, the anti-reflective film may have a low reflectance and a high light transmittance, while simultaneously imparting high scratch resistance and anti-fouling properties.

More specifically, the above-discussed unexpected results can be obtained by mainly distributing the solid inorganic nanoparticles in a region of the low-refractive layer of the anti-reflective film close to the interface between the hard coating layer and the low-refractive layer and mainly distributing the hollow inorganic nanoparticles in a region of the low-refractive layer farther away from this interface by using a specific manufacturing method, which is described below. As a result, it is possible to achieve a reflectance lower than the reflectance obtained using the inorganic particles in the past, and the low-refractive layer may simultaneously impart significantly improved scratch resistance and anti-fouling properties to the film.

The hollow inorganic nanoparticles and the solid inorganic nanoparticles may be dispersed in the binder resin forming the low-refractive index layer, which is formed on one surface of the hard coating layer. In such a layer at least 70 vol % of the entire solid inorganic nanoparticles may be present within a distance $d_{1/2}$ measured from the interface between the hard coating layer and the low-refractive layer, where the distance $d_{1/2}$ is half the entire thickness d of the low-refractive layer, and most of the solid inorganic nanoparticles are present in a specific region in a cross section of the low-refractive layer.

Whether the hollow inorganic nanoparticles and the solid inorganic nanoparticles are present in specific regions may be determined by measuring each of the hollow inorganic nanoparticles or each of the solid inorganic nanoparticles present in the specific region, respectively, and reducing the number of particles by the number of particles present on an interface of the specific region.

Further, the hollow inorganic nanoparticles may be mainly distributed in the region of the low-refractive layer farther away from the interface between the hard coating layer and low-refractive layer. For example, at least 30 vol % of the entire hollow inorganic nanoparticles may be present at a distance farther than that of the entire solid inorganic nanoparticles from the interface between the hard coating layer and low-refractive layer in a thickness direction of the low-refractive layer. Preferably, at least 70 vol % of the entire solid inorganic nanoparticles may be present within a distance $d_{1/3}$ measured from the interface between the hard coating layer and the low-refractive layer, where the distance $d_{1/3}$ is one-third of the entire thickness d of the low-refractive layer and at least 70 vol % of the entire hollow inorganic nanoparticles may be present beyond the distance $d_{1/3}$ measured from an interface between the hard coating layer and the low-refractive layer.

As the solid inorganic nanoparticles are mainly distributed in the region of the low-refractive layer close to the interface between the hard coating layer and the low-refractive layer and the hollow inorganic nanoparticles are mainly distributed in the region of the low-refractive layer away from the interface, two or more portions or two or more layers having different refractive indices may be formed in the low-refractive layer, thereby decreasing the reflectance of the anti-reflective film.

Specific distribution of the solid inorganic nanoparticles and the hollow inorganic nanoparticles in the low-refractive layer may be obtained by adjusting the difference between the densities of the solid inorganic nanoparticles and the hollow inorganic nanoparticles, and adjusting a drying temperature of a photocurable resin composition to form a low-refractive layer containing the two kinds of nanoparticles, as described above, according to manufacturing method described below.

The density difference between the solid inorganic nanoparticles and the hollow inorganic nanoparticles may be 0.30 $g/cm^3$ to 3.00 $g/cm^3$, 0.40 $g/cm^3$ to 1.50 $g/cm^3$, or 0.50 $g/cm^3$ to 0.90 $g/cm^3$. In the low-refractive layer formed using the manufacturing method described below, smooth flow between the solid inorganic nanoparticles and the hollow inorganic nanoparticles may be further improved, thereby resulting in an uneven distribution of the solid inorganic nanoparticles and the hollow inorganic nanoparticles. Therefore, in the anti-reflective film according to the exemplary embodiment of this application, the solid inorganic nanoparticles may be positioned in a region of the low-refractive layer to be closer to the interface between the low-refractive layer and the hard coating layer.

The solid inorganic nanoparticles may have a density of 2.00 $g/cm^3$ to 5.00 $g/cm^3$, and the hollow inorganic nanoparticles may have a density of 1.50 $g/cm^3$ to 3.50 $g/cm^3$. The anti-reflective film may have an average reflectance of 0.7% or less in a visible light wavelength region of 380 nm to 780 nm.

In another exemplary embodiment of the anti-reflective film of this application, the low-refractive layer may include a first layer containing at least 70 vol % of the entire solid inorganic nanoparticles and a second layer containing at least 70 vol % of the entire hollow inorganic nanoparticles, wherein the first layer may be positioned to be closer to the interface between the hard coating layer and the low-refractive layer than the second layer. As described above, the solid inorganic nanoparticles are mainly distributed in the region of the low-refractive layer of the anti-reflective film close to the interface between the hard coating layer and the low-refractive layer, and the hollow inorganic nanoparticles are mainly distributed in the region of the low-refractive layer away from the interface. In this exemplary embodiment, the regions in which the solid inorganic nanoparticles and the hollow inorganic nanoparticles are mainly distributed may form independent layers, respectively, which may be visibly confirmed in the low-refractive layer.

The solid inorganic nanoparticles have an average maximum diameter of less than 100 nm, and a shape in which an empty space is not present in the insides thereof, whereas the hollow inorganic nanoparticles have an average maximum diameter of less than 200 nm, and a shape in which an empty space is present on the surfaces and/or the insides thereof.

The solid inorganic nanoparticles may have an average diameter of 0.5 to 100 nm, or 1 to 30 nm, and the hollow inorganic nanoparticles may have an average diameter of 1 to 200 nm, or 10 to 100 nm.

Each of the solid inorganic nanoparticles and hollow inorganic nanoparticles contains one or more reactive functional groups selected from the group consisting of a (meth) acrylate group, an epoxide group, a vinyl group, and a thiol group on a surface thereof. Thus, the low-refractive layer may have a higher cross-linking density, thereby further improving the scratch resistance and anti-fouling properties.

The low-refractive layer as described above may be manufactured from a photocurable coating composition containing a photopolymerizable compound, a fluorine-containing compound, the hollow inorganic nanoparticles, the solid inorganic nanoparticles, and a photoinitiator. The fluorine-containing compound may include a photoreactive functional group.

The binder resin of the low-refractive layer may contain a cross-linked (co)polymer of the photopolymerizable compound and the fluorine-containing compound including the photoreactive functional group.

The photopolymerizable compound may form a substrate of the binder resin of the manufactured low-refractive layer. The photopolymerizable compound may include a monomer or oligomer including (meth)acrylate or a vinyl group. Preferably, the photopolymerizable compound may include a monomer or oligomer including at least one, at least two, or at least three (meth)acrylates or vinyl groups.

The monomer or oligomer including (meth)acrylate may be selected from pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, ethyleneglycol di(meth)acrylate, butanediol di(meth)acrylate, hexaethyl (meth)acrylate, butyl (meth)acrylate, or a mixture of two or more thereof; or an urethane modified acrylate oligomer, an epoxide acrylate oligomer, an etheracrylate oligomer, a dendritic acrylate oligomer, or a mixture of two or more thereof. Preferably, the molecular weigh of the oligomer is 1,000 to 10,000.

Examples of the monomer or oligomer including the vinyl group may include divinyl benzene, styrene, or paramethylstyrene.

A content of the photopolymerizable compound in the photocurable coating composition is not particularly limited, but in consideration of mechanical properties, and the like, of the low-refractive layer or anti-reflective film to be finally manufactured, the content of the photopolymerizable compound may be 5 wt % to 80 wt % based on a solid component of the photocurable coating composition. The solid component of the photocurable coating composition refers to the solid-state component of the photocurable coating composition except for liquid-state components, for example, an organic solvent, and the like, which may be selectively contained as described below.

The photopolymerizable compound may further contain a fluorinated (meth)acrylate based monomer or oligomer in addition to the above-mentioned monomer or oligomer. When the photopolymerizable compound further contains the fluorinated (meth)acrylate based monomer or oligomer, a weight ratio of the fluorinated (meth)acrylate based monomer or oligomer to the monomer or oligomer including the (meth)acrylate or vinyl group may be 0.1% to 10%. The fluorinated (meth)acrylate based monomer or oligomer may include one or more compounds selected from the of the following compounds represented by Chemical Formulas 11 to 15:

[Chemical Formula 11]

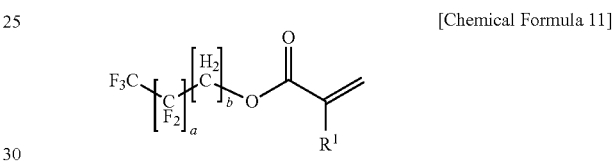

In Chemical Formula 11, R1 is hydrogen or an alkyl group having 1 to 6 carbon atoms, a is an integer of 0 to 7, and b is an integer of 1 to 3.

[Chemical Formula 12]

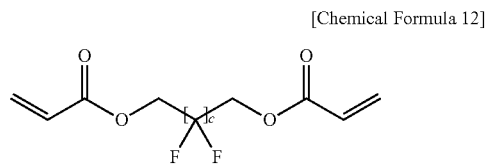

In Chemical Formula 12, c is an integer of 1 to 10.

[Chemical Formula 13]

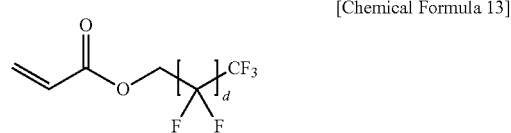

In Chemical Formula 13, d is an integer of 1 to 11.

[Chemical Formula 14]

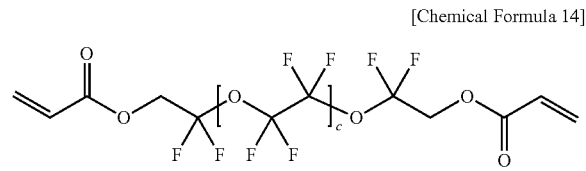

In Chemical Formula 14, e is an integer of 1 to 5.

[Chemical Formula 15]

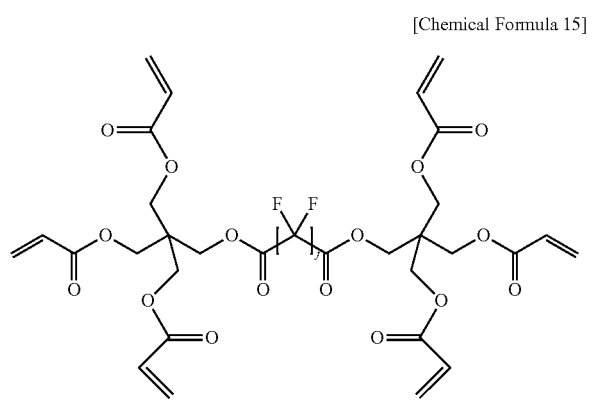

In Chemical Formula 15, f is an integer of 4 to 10.

A moiety derived from the fluorine-containing compound including the photoreactive functional group may be contained in the low-refractive layer. The fluorine-containing compound may be substituted with one or more photoreactive functional group, wherein the photoreactive functional group is a functional group capable of being polymerized by light irradiation, for example, visible light irradiation or UV light irradiation. Such a flourine-containing compound may be referred to as a fluorine-containing compound including a photoreactive functional group. The photoreactive functional groups may include a (meth)acrylate group, an epoxide group, a vinyl group, or a thiol group.

The fluorine-containing compound including the photoreactive functional group may be i) an aliphatic compound or alicyclic compound substituted with one or more photoreactive functional groups, and at least one carbon atom is substituted with one or more fluorine atoms; ii) a hetero aliphatic compound or hetero alicyclic compound in which one or more photoreactive functional groups are substituted, at least one hydrogen atom is substituted with a fluorine atom, and one or more carbon atoms are substituted with a silicon atom; iii) a polydialkylsiloxane based polymer (for example, polydimethylsiloxane based polymer) in which one or more photoreactive functional groups are substituted, and at least one silicon atom is substituted with one or more fluorine atoms; iv) a polyether compound in which one or more photoreactive functional groups are substituted, and at least one hydrogen atom is substituted with a fluorine atom; or a mixture of two or more of i) to iv) or a copolymer thereof.

Each of the fluorine-containing compounds including the photoreactive functional group may have a weight average molecular weight (weight average molecular weight measured by gel permeation chromatography (GPC) in terms of polystyrene) of 2,000 to 200,000, preferably 5,000 to 100,000.

When the weight average molecular weight of the fluorine-containing compounds including the photoreactive functional group is excessively small, the fluorine-containing compounds may not be uniformly and effectively arranged on a surface of, but are positioned inside, the low-refractive layer, thereby deteriorating the anti-fouling property of the surface of the low-refractive layer. The mechanical properties, such as entire strength, scratch resistance, and the like, may also be deteriorated due to a decrease in the cross-linking density of the low-refractive layer.

Further, when the weight average molecular weight of the fluorine-containing compounds including the photoreactive functional group is excessively large, compatibility with other components in the photocurable coating composition may deteriorate, thereby increasing the haze and decreasing the light transmittance and strength of the low-refractive layer.

The photocurable coating composition may contain 20 to 300 parts by weight of the fluorine-containing compound including the photoreactive functional group, based on 100 parts by weight of the photopolymerizable compound.

When an amount of the fluorine-containing compound including the photoreactive functional group is significantly more than the amount of the photopolymerizable compound, a coating property of the photocurable coating composition according to the exemplary embodiment may deteriorate, or the low-refractive layer obtained from the photocurable coating composition may not have sufficient durability or scratch resistance. Further, when the amount of the fluorine-containing compound including the photoreactive functional group is significantly lower than the amount of the photopolymerizable compound, the low-refractive layer obtained from the photocurable coating composition may not have sufficient mechanical properties, such as anti-fouling property, scratch resistance, or the like.

The fluorine-containing compound including the photoreactive functional group may further contain silicon or a silicon compound. The amount of silicon in the fluorine-containing compound including the photoreactive functional group may be 0.1 wt % to 20 wt %.

The silicon contained in the fluorine-containing compound including the photoreactive functional group may improve compatibility with other components contained in the photocurable coating composition according to the exemplary embodiment. The silicon may serve to increase transparency by preventing haze generation in the finally manufacture refractive layer. However, when the amount of silicon in the fluorine-containing compound including the photoreactive functional group is excessively high, compatibility between other ingredients contained in the photocurable coating composition and the fluorine-containing compound may deteriorate, and the finally manufactured low-refractive layer or anti-reflective film may not have sufficient light transmittance or anti-reflection performance, such that the anti-fouling property of the surface may also deteriorate.

The low-refractive layer may contain 10 to 400 parts by weight of the hollow inorganic nanoparticles and 10 to 400 parts by weight of the solid inorganic nanoparticles, based on 100 parts by weight of the (co)polymer of the photopolymerizable compound.

When the amounts of the hollow inorganic nanoparticles and the solid inorganic nanoparticles in the low-refractive layer are excessively high, the hollow inorganic nanoparticles and the solid inorganic nanoparticles may not be sufficiently phase-separated during the manufacturing process of the low-refractive layer, such the surface may become excessively uneven, and the anti-fouling property may deteriorate. Alternatively, when the amounts of the hollow inorganic nanoparticles and the solid inorganic nanoparticles in the low-refractive layer are excessively low, it may be difficult for the solid inorganic nanoparticles to maintain their position in the region close to the interface between the hard coating layer and the low-refractive layer, thereby significantly increasing the reflectance of the low-refractive layer.

The low-refractive layer may have a thickness of 1 nm to 300 nm, or 50 nm to 200 nm. A surface of each of the hollow inorganic nanoparticles and the solid inorganic nanoparticles contained in the low-refractive layer may be substituted with a reactive functional group or a silane coupling agent.

The reactive functional group may include one or more functional groups selected from alcohol, amine, carboxylic acid, epoxide, imide, (meth)acrylate, nitrile, norbornene, olefin, polyethylene glycol, thiol, silane, and vinyl groups.

The silane coupling agent may include one or more selected from vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-(meth)acryloxypropyltriethoxysilane, 3-(meth)acryloxypropyltrimethoxysilane, 3-(meth)acryloxypropylmethyldimethoxysilane, 3-(meth)acryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatepropyltriethoxysilane.

The low-refractive layer may further contain a silane based compound including one or more reactive functional groups, including at least one selected from a vinyl group and a (meth)acrylate group.

Inclusion of the silane based compound having a reactive functional group may improve mechanical properties, for example, scratch resistance of the low-refractive layer.

Further, it is possible to improve internal characteristics of the low-refractive layer due to the silane functional group or the silicon atom included in the silane based compound. As the silane functional group or the silicon atom included in the silane based compound is uniformly distributed in the low-refractive layer, a lower average reflectance may be implemented, and inorganic fine particles uniformly distributed in the low-refractive layer may be uniformly bound to the photopolymerizable compound due to the silane functional group or the silicon atom, thereby making it possible to improve scratch resistance of the finally manufactured anti-reflective film.

As described above, the silane based compound including one or more reactive functional groups selected from the group consisting of the vinyl group and the (meth)acrylate group has a chemical structure including both the reactive functional group and the silicon atom. Thus, the internal characteristics of the low-refractive layer may be optimized to decrease a refractive index, thereby reducing the reflectance and increasing the light transmittance, while also imparting excellent abrasion resistance or scratch resistance because of the uniform cross-linking density.

The silane based compound may include 100 to 1,000 g/mol (equivalent weight) of the reactive functional group.

When the amount of the reactive functional group in the silane based compound is excessively low, it may be difficult to sufficiently improve scratch resistance or mechanical properties of the low-refractive layer. Alternatively, when the amount of the reactive functional group in the silane based compound is excessively high, uniformity or dispersibility of the inorganic fine particles in the low-refractive layer may deteriorate, thereby deteriorating the light transmittance, or the like, of the low-refractive layer.

The silane based compound may include one or more reactive functional groups including at least one group selected from a vinyl group and a (meth)acrylate group, and may have a weight average molecular weight (weight average molecular weight measured by gel permeation chromatography (GPC) in terms of polystyrene) of 100 to 5,000, or 200 to 3,000.

The silane based compound may also include one or more trialkoxysilane groups to which an alkylene group having 1 to 10 carbon atoms are bound, or an organic functional group including an urethane functional group in addition to the one or more reactive group selected from a vinyl group and a (meth)acrylate group. The trialkoxysilane group may be a functional group in which three alkoxy groups having 1 to 3 carbon atoms are substituted in a silicon compound.

Although a specific chemical structure of the silane based compound including one or more reactive functional groups including at least one selected from the group consisting of a vinyl group and a (meth)acrylate group is not limited. Examples thereof include vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-(meth)acryl oxypropyltriethoxysilane, 3-(meth)acryloxypropyltrimethoxysilane, 3-(meth)acryloxypropylmethyldimethoxysilane, 3-(meth)acryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, or a mixture of two or more thereof.

A hard coating layer generally known in the art may be used without limitation. Examples of the hard coating layer may include a hard coating layer containing a binder resin including a photocurable resin; and an antistatic agent dispersed in the binder resin.

The photocurable resin contained in the hard coating layer may be a polymer of a photopolymerizable compound capable of undergoing a polymerization reaction when light, such as UV light, or the like, is irradiated The photocurable resin may be a photocurable resin generally used in the art. However, preferably, the photopolymerizable compound may be a multi-functional (meth)acrylate based monomer or oligomer. In view of securing physical properties of the hard coating layer, the number of (meth)acrylate based functional groups is 2 to 10, preferably, 2 to 8, and more preferably 2 to 7. More preferably, the photopolymerizable compound may be one or more selected from pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, or trimethylolpropane polyethoxy tri(meth)acrylate.

The antistatic agent may be a quaternary ammonium salt compound; a pyridinium salt; a cationic compound having 1 to 3 amino groups; an anionic compound such as a sulfonic acid base, a sulfuric acid ester base, a phosphoric acid ester base, a phosphonic acid base, or the like; an amphoteric compound such as an amino acid based or amino sulfuric acid ester based compound, or the like; a non-ionic compound such as an imino alcohol based compound, a glycerine based compound, a polyethylene glycol based compound, or the like; an organic metal compound such as metal alkoxide compound containing tin, titanium, etc., or the like; a metal chelate compound such as an acetylacetonate salt of the organic metal compound, or the like; a reaction product or polymer compound of two or more thereof; or a mixture of two or more thereof. The quaternary ammonium salt compound may be a compound having one or more quaternary ammonium salt groups in a molecule, and a low-molecular weight quaternary ammonium salt compound or a high-molecular weight quaternary ammonium salt compound may be used without limitation.

As the antistatic agent, a conductive polymer and metal oxide fine particles may also be used. Examples of the conductive polymer include aromatic conjugated poly(paraphenylene), heterocyclic conjugated polypyrrole, polythiophene, aliphatic conjugated polyacetylene, hetero atom-containing conjugated polyaniline, and mixed type conjugated poly(phenylenevinylene), a double chain conjugated compound, which is conjugated compound having a plurality of conjugated chains in a molecule, a conductive complex in which a conjugated polymer chain is grafted to or block-copolymerized with a saturated polymer, and the like. The metal oxide fine particles may be made of zinc oxide, antimony oxide, tin oxide, cerium oxide, indium tin oxide, indium oxide, aluminum oxide, tin oxide doped with antimony, zinc oxide doped with aluminum, or the like.

The hard coating layer containing the binder resin made of the photocurable resin; and an antistatic agent dispersed in the binder resin may further contain one or more compounds selected from an alkoxy silane based oligomer and a metal alkoxide based oligomer.

The alkoxy silane based compound may be an alkoxy silane based compound generally used in the art, and may be one or more compounds selected from tetramethoxysilane, tetraethoxysilane, tetraisopropoxysilane, methyltrimethoxysilane, methyltriethoxysilane, (meth)acryloxylpropyltrimethoxysilane, glycidoxypropyl trimethoxysilane, and glycidoxypropyl triethoxysilane.

The metal alkoxide based oligomer may be prepared by a sol-gel reaction of a composition containing a metal alkoxide based compound and water. The sol-gel reaction may be carried out by diluting the metal alkoxide based compound in an organic solvent and then slowly dropping water thereinto because the metal alkoxide based compound may violently react with water. It is preferable that a molar ratio (based on a metal ion) of the metal alkoxide compound to water is adjusted in a range of 3 to 170 in consideration of reaction efficiency, or the like.

The metal alkoxide based compound may be one or more compounds selected from the group consisting of titanium tetra-isopropoxide, zirconium isopropoxide, and aluminum isopropoxide.

Another example of the hard coating layer is an antiglare film having a surface on which an uneven shape is formed, or a film having a surface subjected to antiglare treatment (haze imparting treatment, or the like). The hard coating layer may contain a binder resin containing a photocurable resin and organic or inorganic fine particles dispersed in the binder resin.

The photocurable resin contained in the hard coating layer is a polymer of a photopolymerizable compound capable of being polymerized when light such as UV light, or the like, is irradiated, and a photocurable resin generally known in the art may be used. For example, the photocurable resin may include one or more selected from a reactive acrylate oligomer including an urethane acrylate oligomer, an epoxide acrylate oligomer, polyester acrylate, and polyether acrylate; and the multi-functional acrylate monomer group of dipentaerythritol hexaacrylate, di pentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-dihexanediol acrylate, propoxylated glycero triacrylate, tripropylene glycol diacrylate, and ethylene glycol diacrylate.

The organic or inorganic fine particles may have a particle diameter of 1 to 10 μm. The organic or inorganic fine particles may be organic fine particles made of an acrylic resin, a styrene based resin, an epoxide resin, and a nylon resin, or inorganic fine particles made of silicon oxide, titanium dioxide, indium oxide, tin oxide, zirconium oxide, and zinc oxide.

The hard coating layer may have a thickness of 0.1 μm to 100 μm.

The anti-reflective film may further include a substrate bonded to the other surface of the hard coating layer. A specific kind or thickness of substrate is not particularly limited, but a substrate known to be used for manufacturing a low-refractive layer or anti-reflective film may be used without limitation.

Another exemplary embodiment of this application is a manufacturing method of an anti-reflective film including: applying a resin composition for forming a low-refractive layer, containing a photopolymerizable compound or a (co) polymer thereof, a fluorine-containing compound including a photoreactive functional group, a photoinitiator, hollow inorganic nanoparticles, and solid inorganic nanoparticles on a hard coating layer and drying the applied resin composition at a temperature of 35° C. to 100° C.; and photocuring the dried resin composition.

In the anti-reflective film manufactured by the above-described manufacturing method, the hollow inorganic nanoparticles and the solid inorganic nanoparticles are distributed in the low-refractive layer so as to be distinguished from each other, such that the anti-reflective film may have low reflectance and high light transmittance, while simultaneously imparting high scratch resistance and anti-fouling properties.

The anti-reflective film may include the hard coating layer; and the low-refractive layer formed on one surface of the hard coating layer wherein the low-refractive layer may contain the binder resin and the hollow inorganic nanoparticles and the solid inorganic nanoparticles which are dispersed in the binder resin, wherein at least 70 vol % of the entire solid inorganic nanoparticles may be present within a distance corresponding to 50% of the entire thickness of the low-refractive layer from an interface between the hard coating layer and the low-refractive layer.

Further, at least 30 vol % of the hollow inorganic nanoparticles may be present at a distance farther than that of the entire solid inorganic nanoparticles from the interface between the hard coating layer and low-refractive layer in a thickness direction of the low-refractive layer.

Preferably, at least 70 vol % of the entire solid inorganic nanoparticles may be present within a distance corresponding to 30% of the entire thickness of the low-refractive layer from the interface between the hard coating layer and the low-refractive layer, and at least 70 vol % of the hollow inorganic nanoparticles may be present in a region at a distance exceeding 30% of the entire thickness of the low-refractive layer from an interface between the hard coating layer and the low-refractive layer.

Further, in the anti-reflective film manufactured by the manufacturing method of an anti-reflective film, the low-refractive layer may include a first layer containing at least 70 vol % of the entire solid inorganic nanoparticles and a second layer containing at least 70 vol % of the entire hollow inorganic nanoparticles, wherein the first layer may be positioned to be closer to the interface between the hard coating layer and the low-refractive layer than the second layer.

The low-refractive layer may be formed by applying the resin composition for forming a low-refractive layer on the hard coating layer and drying the applied resin composition at a temperature of 35 to 100° C. or 40 to 80° C.

When a drying temperature of the resin composition for forming a low-refractive layer applied on the hard coating layer is lower than 35° C., an anti-fouling property of the formed low-refractive layer may be significantly deteriorated, and when the drying temperature of the resin composition for forming a low-refractive layer applied on the hard coating layer is higher than 100° C., the hollow inorganic nanoparticles and the solid inorganic nanoparticles may not be sufficiently phase-separated, such that the scratch resistance and anti-fouling property of the low-refractive layer may deteriorate, and the reflectance may increase significantly.

The low-refractive layer having the-above mentioned characteristics may be formed by adjusting the difference in the density the solid inorganic nanoparticles and the hollow inorganic nanoparticles, in addition to the drying temperature during a drying process of the resin composition in the manufacturing process of low-refractive layer applied on the hard coating layer.

The difference in the densities of the solid inorganic nanoparticles and the hollow inorganic nanoparticles may be 0.30 g/cm$^3$ to 3.00 g/cm$^3$, 0.40 g/cm$^3$ to 1.50 g/cm$^3$, or 0.50 g/cm$^3$ to 0.90 g/cm$^3$. In the formed low-refractive layer using the manufacturing method according to the exemplary embodiment of this application, a smooth flow between the solid inorganic nanoparticles and the hollow inorganic nanoparticles may be further improved, and the solid inorganic nanoparticles and the hollow inorganic nanoparticles may be unevenly distributed. Therefore, the solid inorganic nanoparticles may be positioned in a region of the low-refractive layer formed on the hard coating layer to be closer to the hard coating layer.

The solid inorganic nanoparticles may have a density of 2.00 g/cm$^3$ to 5.00 g/cm$^3$, and the hollow inorganic nanoparticles may have a density of 1.50 g/cm$^3$ to 3.50 g/cm$^3$. The resin composition applied on the hard coating layer may be dried at a temperature of 35° C. to 100° C., and may be performed for 10 seconds to 5 minutes, or preferably, 30 seconds to 4 minutes.

When the drying time is excessively short, a phase separation phenomenon between the hollow inorganic nanoparticles and the solid inorganic nanoparticles described above may not sufficiently occur. On the contrary, when the drying time is excessively long, the low-refractive layer may infiltrate into the hard coating layer.

The low-refractive layer may be manufactured from a photocurable coating composition containing a photopolymerizable compound or a (co)polymer thereof, a fluorine-containing compound including a photoreactive functional group, the hollow inorganic nanoparticles, the solid inorganic nanoparticles, and a photoinitiator.

The low-refractive layer may be obtained by photocuring the resultant obtained by applying the photocurable coating composition on a predetermined substrate. A specific kind or thickness of substrate is not particularly limited, but a substrate known to be used for manufacturing a low-refractive layer or anti-reflective film may be used without limitation.

A method and an apparatus generally used to apply the photocurable coating composition may be used without particular limitation. For example, a bar coating method such as a Meyer bar coating method, or the like, a gravure coating method, a 2-roll reverse coating method, a vacuum slot die coating method, a 2-roll coating method, or the like, may be used.

The low-refractive layer may have a thickness of 1 nm to 300 nm, or 50 nm to 200 nm. In the photocuring of the photocurable coating composition, UV light or visible light, having a wavelength of 200 to 400 nm, may be irradiated for an exposure amount of 100 to 4,000 mJ/cm$^2$. The exposure time is not particularly limited, but may be suitably changed depending on a used exposure device, a wavelength of the irradiated light, or the exposure amount.

During the photocuring of the photocurable coating composition, nitrogen purging, or the like, may be performed in order to apply a nitrogen atmosphere condition.

Detailed contents of the photopolymerizable compound, the hollow inorganic nanoparticles, the solid inorganic nanoparticles, and the fluorine-containing compound including the photo-reactive functional group include those in the anti-reflective film according to the exemplary embodiment described above.

Each of the hollow inorganic nanoparticles and the solid inorganic nanoparticles may be contained in the composition as a colloidal phase in which they are dispersed in a predetermined dispersion medium. The colloidal phase containing each of the hollow inorganic nanoparticles and the solid inorganic nanoparticles may contain an organic solvent as the dispersion medium.

The amounts of the hollow inorganic nanoparticles and the solid inorganic nanoparticles in the colloidal phase may be determined in consideration of the amounts of the hollow inorganic nanoparticles and the solid inorganic nanoparticles in the photocurable coating composition, a viscosity of the photocurable coating composition, or the like. For example, solid contents of the hollow inorganic nanoparticles and the solid inorganic nanoparticles in the colloidal phase may be 5 wt % to 60 wt %, respectively.

Examples of the organic solvent used as the dispersion medium may include alcohols such as methanol, isopropylalcohol, ethyleneglycol, butanol, and the like; ketones such as methylethylketone, methylisobutylketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

Any compound may be used as the photoinitiator without particular limitation as long as it is known to be usable in a photocurable resin composition. More specifically, a benzophenone based compound, an acetophenone based compound, a biimidazole based compound, a triazine based compound, an oxime based compound, or a mixture of two or more thereof may be used.

The photoinitiator may be used in a content of 1 to 100 parts by weight based on 100 parts by weight of the photopolymerizable compound. When the amount of photoinitiator is excessively low, some materials that are not cured in the photocuring of the photocurable coating composition may remain. When the amount of photoinitiator is excessively high, unreacted initiator may remain as an impurity or a cross-linking density may be decreased, such that mechanical property of a manufactured film may deteriorate, or a reflectance thereof may significantly increase.

The photocurable coating composition may further contain an organic solvent.

A non-restrictive example of the organic solvent may include ketones, alcohols, acetates, and ethers, or a mixture of two or more thereof.

Examples of the above-described organic solvent may include ketones such as methylethylketone, methylisobutylketone, acetylacetone, isobutylketone, or the like; alcohols such as methanol, ethanol, diacetone alcohol, n-propanol, i-propanol, n-butanol, i-butanol, t-butanol, or the like; acetates such as ethylacetate, i-propylacetate, polyethyleneglycol monomethylether acetate, or the like; ethers such as tetrahydrofuran, propyleneglycol monomethylether, or the like; or a mixture of two or more thereof.

The organic solvent may be added at the time of mixing each of the components contained in the photocurable coating composition, or be added in a state in which each of the components is dispersed in or mixed with the organic solvent, such that the organic solvent may be contained in the photocurable coating composition. When the amount of the organic solvent in the photocurable coating composition is excessively low, flowability of the photocurable coating composition may deteriorate, such that defects such as formation of a stripe pattern, or the like, may occur in the finally manufactured film. When the amount of the organic solvent is excessively high, the solid content of the composition may decrease, such that coating and film formation may not be sufficiently performed. Thus, the physical properties or surface characteristics of the film may deteriorate, and a defect may occur in the drying and curing processes. The amount of the organic solvent in the photocurable coating composition is such that a total content of the solid components contained therein is 1 wt % to 50 wt %, or 2 wt % to 20 wt %.

A material of the hard coating layer is not particularly limited as long as it is known to be usable in an anti-reflective film.

The manufacturing method of an anti-reflective film may further include applying a polymer resin composition containing a photopolymerizable compound or a (co)polymer thereof, a photoinitiator, and an antistatic agent on a substrate, and photocuring the applied polymer resin composition to form the hard coating layer.

The components used to form the hard coating layer are the same as those of the anti-reflective film according to the present invention described above.

The polymer resin composition for forming a hard coating layer may further contain one or more compounds selected from the group consisting of an alkoxy silane based oligomer and a metal alkoxide based oligomer.

A method and an apparatus generally used to apply the polymer resin composition for forming a hard coating layer may be used without particular limitation. For example, a bar coating method such as a Meyer bar coating method, or the like, a gravure coating method, a 2-roll reverse coating method, a vacuum slot die coating method, a 2-roll coating method, or the like, may be used.

Photocuring of the polymer resin composition to form a hard coating layer may be carried out by irradiating UV light or visible light having a wavelength of 200 to 400 nm. At the time of irradiation, it is preferable that an exposure amount is 100 to 4,000 mJ/cm$^2$. The exposure time is not particularly limited, but may be suitably changed depending on a used exposure device, a wavelength of the irradiated light, or the exposure amount. Further, nitrogen purging, or the like, may be performed in order to apply a nitrogen atmosphere condition.

EXAMPLES

The present invention will be described in more detail through the following Examples. However, the following Examples are only to exemplify the present invention, and contents of the present invention are not limited by the following Examples.

Preparation Example

Preparation Example: Manufacturing of Hard Coating Layer

A salt-type antistatic hard coating solution (KYOEISHA Chemical Co., Ltd., solid content: 50 wt %, product name: LJD-1000) was coated on a triacetyl cellulose film using a #10 Mayer bar, dried at 90° C. for 1 minute, and irradiated with UV light (150 mJ/cm$^2$), thereby manufacturing a hard coating layer having a thickness of about 5 to 6 μm.

Examples 1 to 5: Manufacturing of Anti-Reflective Film

Examples 1 to 4

(1) Preparation of Photocurable Coating Composition for Forming Low-Refractive Layer Based on 100 parts by weight of pentaerythritoltriacrylate (PETA), 281 parts by weight of hollow silica nanoparticles (diameter: about 50 to 60 nm, density: 1.96 g/cm$^3$, JSC catalyst and chemicals), 63 parts by weight of solid silica nanoparticles (diameter: about 12 nm, density: 2.65 g/cm$^3$), 131 parts by weight of a first fluorine-containing compound (X-71-1203M, ShinEtsu), 19 parts by weight of a second fluorine-containing compound (RS-537, DIC), and 31 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating layer in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging.

Example 5

(1) Preparation of Photocurable Coating Composition for Forming Low-Refractive Layer Based on 100 parts by weight of trimethylolpropane triacrylate (TMPTA), 268 parts by weight of hollow silica nanoparticles (diameter: about 50 to 60 nm, density: 1.96 g/cm$^3$, JSC catalyst and chemicals), 55 parts by weight of solid silica nanoparticles (diameter: about 12 nm, density: 2.65 g/cm$^3$), 144 parts by weight of a first fluorine-containing compound (X-71-1203M, ShinEtsu), 21 parts by weight of a second fluorine-containing compound (RS-537, DIC), and 31 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating layer in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging.

Example 6

(1) Preparation of Photocurable Coating Composition for Forming Low-Refractive Layer Based on 100 parts by weight of trimethylolpropane triacrylate (TMPTA), 268 parts by weight of hollow silica nanoparticles (diameter: about 50 to 60 nm, density: 1.96 g/cm$^3$, JSC catalyst and chemicals), 70 parts by weight of solid titanium dioxide particles (diameter: about 15 nm, density: 4.3 g/cm$^3$), 149 parts by weight of a first fluorine-containing compound (X-71-1203M, ShinEtsu), 31 parts by weight of a second fluorine-containing compound (RS-537, DIC), and 31 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating layer in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging.

TABLE 1

|  | Drying Temperature | Drying Time |
| --- | --- | --- |
| Example 1 | 40° C. | 1 min |
| Example 2 | 60° C. | 1 min |
| Example 3 | 80° C. | 1 min |
| Example 4 | 60° C. | 2 min |
| Example 5 | 60° C. | 3 min |
| Example 6 | 60° C. | 1 min |

Comparative Example: Manufacturing of Anti-Reflective Film

Comparative Example 1

An anti-reflective film was manufactured by the same method as in Example 1 except the photocurable coating composition is not applied.

Comparative Example 2

A photocurable coating composition for forming a low-refractive layer was prepared by the same method as in Example 1 except for replacing 63 parts by weight of the solid silica nanoparticles used in Example 1 with 63 parts by weight of pentaerythritoltriacrylate (PETA), and an anti-reflective film was manufactured by the same method as in Example 1.

Experimental Example: Measurement of Physical Properties of Anti-Reflective Film Experiments composed of the following categories were performed on the anti-reflective films obtained in the Examples and Comparative Examples.

1. Measurement of Average Reflectance of Anti-Reflective Film

Average reflectances of the anti-reflective films obtained in the Examples and Comparative Examples in a visible light region (380 to 780 nm) were measured using Solidspec 3700 (SHIMADZU).

2. Measurement of Anti-Fouling Property

Anti-fouling property was measured by drawing a straight line having a length of 5 cm on surfaces of the anti-reflective films obtained in the Examples and Comparative Examples using a black pen and confirming the number of scrubbing actions required for erasing the straight line at the time of scrubbing the antireflective film with a wiper.

<Measurement Standard>

◯: The number of rubbing actions required for erasing the straight line was 10 or less.

Δ: The number of rubbing actions required for erasing the straight line was 11 to 20.

X: The number of rubbing actions required for erasing the straight line was more than 20.

3. Measurement of Scratch Resistance

A steel wool (length*width: 2.5 cm*2.5 cm) was rubbed on surfaces of the anti-reflective films obtained in the Examples and Comparative Examples under load while rotating the anti-reflective film at a rate of 27 rpm 10 times. A maximum load at which the number of scratches (1 cm or less) observed by the naked eyes was 1 or less was measured.

4. Confirmation of Phase-Separation

When 70 vol % of the entire used solid inorganic nanoparticles (solid silica nanoparticles) was present within a distance of 30 nm from the hard coating layer in cross-sections of the anti-reflective films in FIGS. 1 to 7, it was determined that phase separation occurred.

TABLE 2

|  | Average Reflectance (%) | Scratch Resistance (g) | Anti-fouling Property | Phase-Separation |
| --- | --- | --- | --- | --- |
| Example 1 | 0.63 | 500 | ◯ | ◯ |
| Example 2 | 0.62 | 500 | ◯ | ◯ |
| Example 3 | 0.67 | 500 | ◯ | ◯ |
| Example 4 | 0.64 | 500 | ◯ | ◯ |
| Example 5 | 0.65 | 500 | ◯ | ◯ |
| Example 6 | 0.60 | 500 | ◯ | ◯ |
| Comparative Example 1 | 0.78 | 150 | X | X |
| Comparative Example 2 | 0.8 | 200 | Δ | X |

As illustrated in FIGS. 1 to 6, it was confirmed that phase separation between the hollow inorganic nanoparticles and the solid inorganic nanoparticles occurred in the low-refractive layers of the anti-reflective films in Example 1 to 6. Most of the solid inorganic nanoparticles were present and concentrated near an interface between the hard coating layer and the low-refractive layer of the anti-reflective film, and most of the hollow inorganic nanoparticles were present and concentrated in a region away from the hard coating layer.

As described above, the anti-reflective films in Examples 1 to 6 have a low reflectance of 0.70% or less in the visible light region and simultaneously impart high scratch resistance and anti-fouling property, as illustrated in Table 2.

Figure 7:
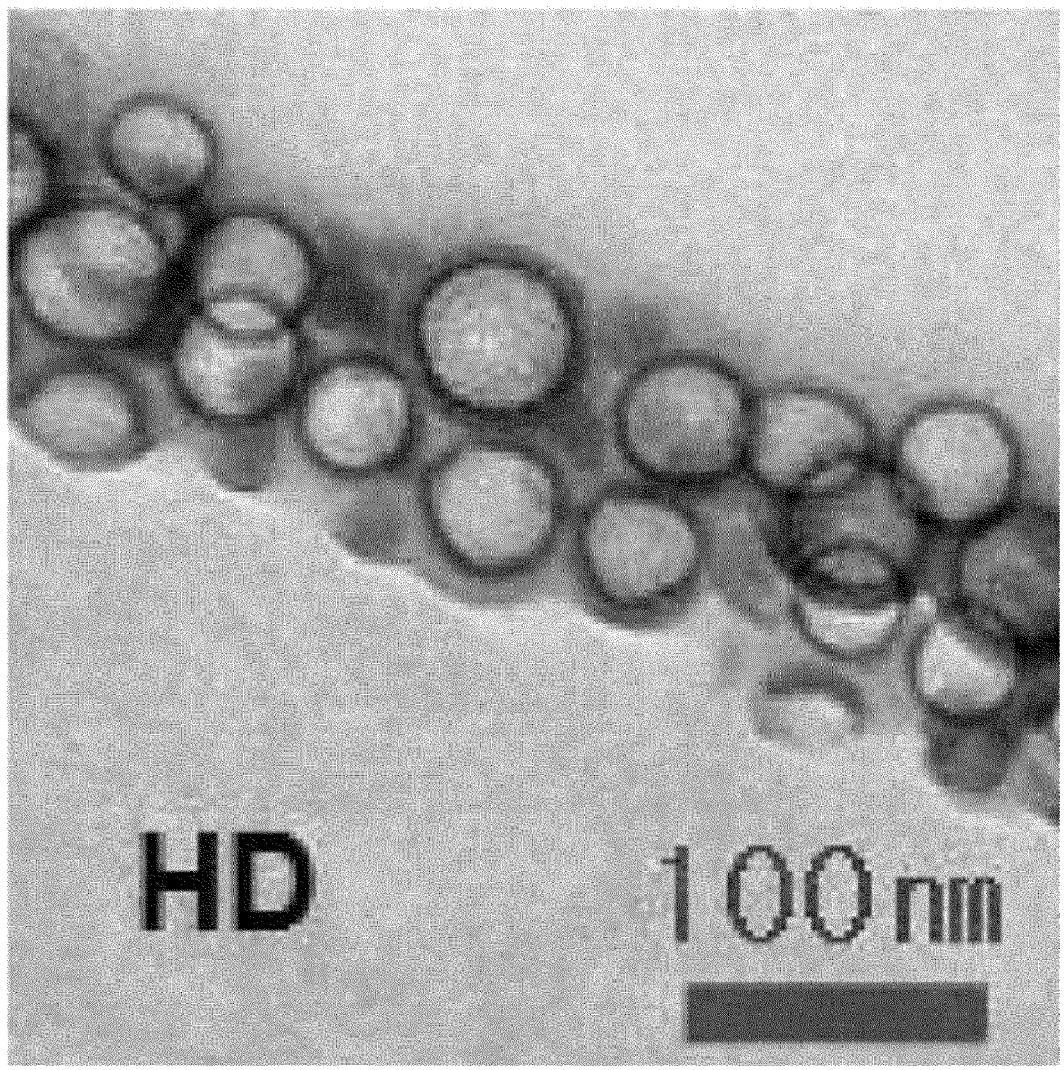
FIG. 7 is a TEM image of a cross section of an anti-reflective film in Comparative Example 1.
Figure 8:
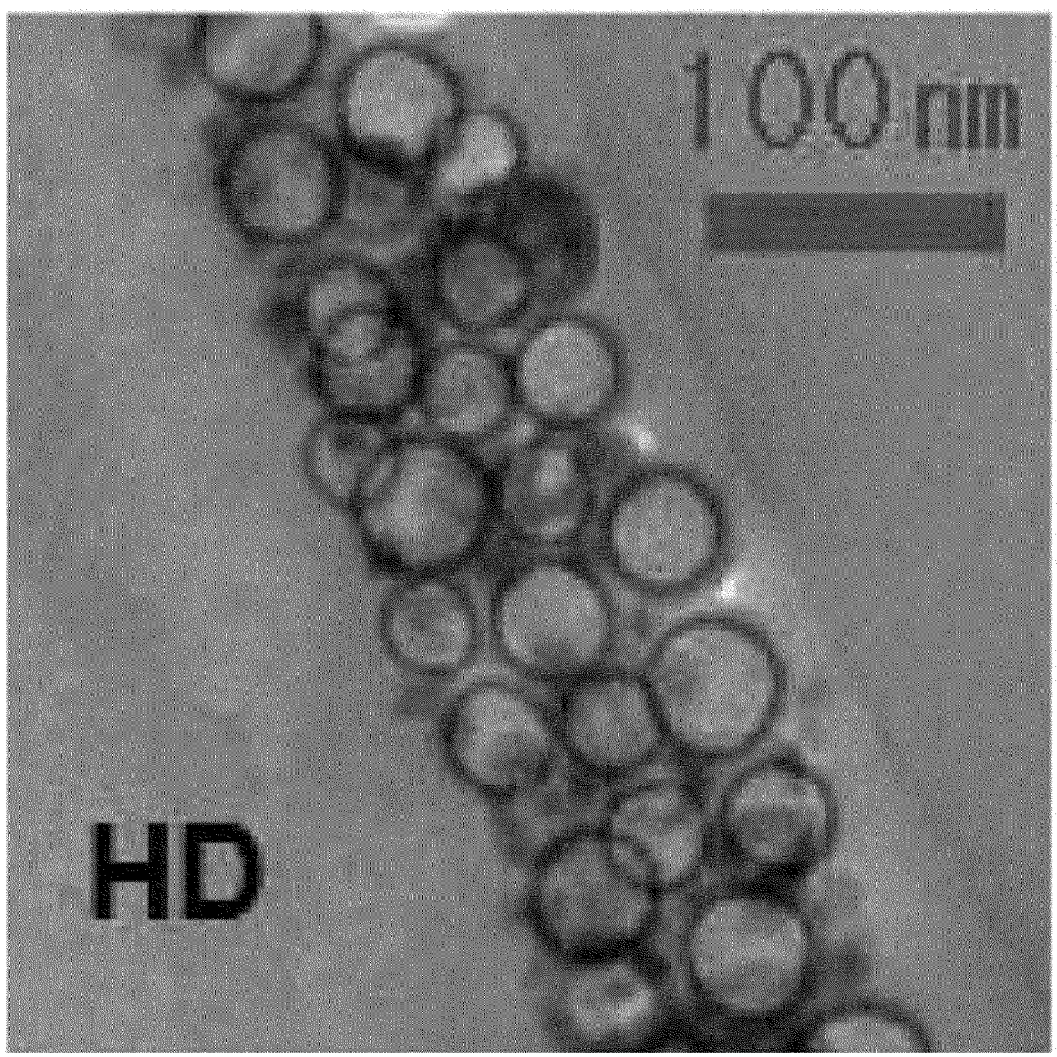
FIG. 8 is a TEM image of a cross section of an anti-reflective film in Comparative Example 2.

On the contrary, as illustrated in FIGS. 7 and 8, it was confirmed that in the low-refractive layers of the anti-reflective films in Comparative Examples 1 and 2, the hollow inorganic nanoparticles and the solid inorganic nanoparticles were not phase-separated, but exist as a uniform mixture.

In addition, as illustrated in Table 2, it was confirmed that the low-refractive layers of the anti-reflective films in Comparative Examples 1 and 2 exhibit low scratch resistance and anti-fouling property in addition to relatively high reflectances, respectively.

What is claimed is:

1. An anti-reflective film comprising: a hard coating layer; and
   a low-refractive index layer formed on one surface of the hard coating layer,
   wherein the low-refractive index layer comprises hollow inorganic nanoparticles and solid inorganic nanoparticles dispersed in a binder resin comprising a (co)polymer of a photopolymerizable compound, wherein the low-refractive index layer contains at least 10 to 400 parts by weight of the hollow inorganic nanoparticles and at least 10 to 400 parts by weight of the solid inorganic nanoparticles, based on 100 parts by weight of the (co)polymer of the photopolymerizable compound,
   wherein the low-refractive index layer includes the hollow inorganic nanoparticles in a higher amount by weight than the solid inorganic nanoparticles, and
   wherein at least 70 vol % of the entire volume of the solid inorganic nanoparticles are present within a distance $d_{1/2}$ measured from an interface between the hard coating layer and the low-refractive index layer, wherein the distance $d_{1/2}$ is half the entire thickness d of the low-refractive index layer.

2. The anti-reflective film of claim 1, wherein:
   a density difference between the solid inorganic nanoparticles and the hollow inorganic nanoparticles is 0.30 g/cm$^3$ to 3.00 g/cm$^3$.

3. The anti-reflective film of claim 2, wherein:
   the solid inorganic nanoparticles have a density of 2.00 g/cm$^3$ to 5.00 g/cm$^3$, and
   the hollow inorganic nanoparticles have a density of 1.50 g/cm$^3$ to 3.50 g/cm$^3$.

4. The anti-reflective film of claim 1, wherein:
   at least 30 vol % of the entire volume of the hollow inorganic nanoparticles are present at a distance farther than that of the entire volume of the solid inorganic nanoparticles from the interface between the hard coating layer and low-refractive index layer in a thickness direction of the low-refractive index layer.

5. The anti-reflective film of claim 1, wherein:
   at least 70 vol % of the entire volume of the solid inorganic nanoparticles are present within a distance $d_{1/3}$ measured from the interface between the hard coating layer and the low-refractive index layer, wherein the distance $d_{1/3}$ is one-third of the entire thickness d of the low-refractive index layer.

6. The anti-reflective film of claim 5, wherein:
   at least 70 vol % of the entire volume of the hollow inorganic nanoparticles are present beyond the distance $d_{1/3}$ measured from the interface between the hard coating layer and the low-refractive index layer.

7. The anti-reflective film of claim 1, wherein:
   the low-refractive index layer includes a first layer containing at least 70 vol % of the entire volume of the solid inorganic nanoparticles and a second layer containing at least 70 vol % of the entire volume of the hollow inorganic nanoparticles,
   the first layer being positioned to be closer to the interface between the hard coating layer and the low-refractive index layer than the second layer.

8. The anti-reflective film of claim 1, wherein:
   the binder resin contained in the low-refractive index layer contains a cross-linked (co)polymer of the (co)polymer of the photopolymerizable compound and a fluorine-containing compound including a photoreactive functional group.

9. The anti-reflective film of claim 8, wherein:
   the fluorine-containing compounds including the photoreactive functional group has a weight average molecular weight of 2,000 to 200,000, respectively.

10. The anti-reflective film of claim 8, wherein:
    the binder resin contains 20 to 300 parts by weight of the fluorine-containing compound including the photoreactive functional group based on 100 parts by weight of the (co)polymer of the photopolymerizable compound.

11. The anti-reflective film of claim 8, wherein:
    the fluorine-containing compound including the photoreactive functional group includes one or more selected from the group consisting of i) an aliphatic compound or alicyclic compound in which one or more photoreactive functional groups are substituted, and at least one carbon atom is substituted with one or more fluorine atoms; ii) a hetero aliphatic compound or hetero alicyclic compound in which one or more photoreactive functional groups are substituted, at least one hydrogen atom is substituted with a fluorine atom, and one or more carbon atoms are substituted with a silicon atom; iii) a polydialkylsiloxane based polymer in which one or more photoreactive functional groups are substituted, and at least one silicon atom is substituted with one or more fluorine atoms; and iv) a polyether compound in which one or more photoreactive functional groups are substituted, and at least one hydrogen atom is substituted with a fluorine atom.

12. The anti-reflective film of claim 1, wherein:
    a surface of each of the hollow inorganic nanoparticles and the solid inorganic nanoparticles contained in the low-refractive index layer comprises a reactive functional group or silane coupling agent.

13. The anti-reflective film of claim 12, wherein:
    the reactive functional group includes one or more functional groups selected from the group consisting of alcohol, amine, carboxylic acid, epoxide, imide, (meth)acrylate, nitrile, norbornene, olefin, polyethylene glycol, thiol, silane, and vinyl groups.

14. The anti-reflective film of claim 1, wherein:
    the hard coating layer includes a binder resin containing a photocurable resin and organic or inorganic fine particles dispersed in the binder resin.

15. The anti-reflective film of claim 14, wherein:
the organic or inorganic fine particles have an average particle diameter of 1 to 10 μm.

\* \* \* \* \*